United States Patent [19]
Martin et al.

[11] Patent Number: 5,632,027
[45] Date of Patent: May 20, 1997

[54] METHOD AND SYSTEM FOR MASS STORAGE DEVICE CONFIGURATION MANAGEMENT

[75] Inventors: Dennis R. Martin, Rochester; Michael J. McDermott, Oronoco, both of Minn.

[73] Assignee: International Business Machines Corporation, Armonk, N.Y.

[21] Appl. No.: 528,287

[22] Filed: Sep. 14, 1995

[51] Int. Cl.$^6$ .................................................. G06F 12/02
[52] U.S. Cl. ........................... 395/497.01; 364/DIG. 1; 395/427; 395/438; 395/439; 395/441; 395/497.03; 395/601
[58] Field of Search ........................ 395/427, 438, 395/439, 441, 497.01, 497.03, 700

[56] References Cited

U.S. PATENT DOCUMENTS

| | | | |
|---|---|---|---|
| Re. 27,703 | 7/1973 | Stafford et al. | 364/200 |
| 3,386,082 | 5/1968 | Stafford et al. | 364/200 |
| 4,014,005 | 3/1977 | Fox et al. | 395/500 |
| 4,970,640 | 11/1990 | Beardsley et al. | 395/284 |
| 5,237,689 | 8/1993 | Behnke | 395/700 |
| 5,369,758 | 11/1994 | Larson et al. | 395/575 |

*Primary Examiner*—Frank J. Asta
*Attorney, Agent, or Firm*—Steven W. Roth; Andrew J. Dillon

[57] ABSTRACT

A method for updating mass storage device configuration records during a configuration change within a computer system is disclosed. A unit configuration record is stored in a system mass storage device. The unit configuration record is unique to each system and it includes a configuration identification, a sequence number and an alteration count table. In addition, a logical device identifier is stored in each mass storage unit within the system. The logical device identifier is unique to each mass storage device unit and it includes a configuration identification, a unit number and an alteration count. If a configuration update is necessary, the corresponding alteration count of the unit configuration record is first incremented, a new logical device identifier is then built with the new alteration count, and finally the new logical device identifier is written to a mass storage device that requires update. After the completion of configuration update, the sequence number is incremented, the updated information is then merged with the functioning copy of unit configuration record and the merged copy is subsequently written on to the system mass storage device. This invention allows a logical configuration change to be made even when the mass storage device of a configured set is unavailable, and thereby eliminating the restriction of all configured mass storage devices must be operational in order to perform a logical configuration change as required by the prior arts.

12 Claims, 6 Drawing Sheets

METHOD AND SYSTEM FOR MASS STORAGE DEVICE CONFIGURATION MANAGEMENT

BACKGROUND OF THE INVENTION

1. Technical Field

The present invention relates to a method and system for managing mass storage device configuration records in general, and in particular to a method and system for updating mass storage device configuration records during a configuration change within a computer system. Still more particularly, the present invention relates to a method and system for updating mass storage device configuration records during a configuration change within a computer system when not all members of a configured set are present or operational.

2. Description of the Prior Art

A computer system often distributes its logically contiguous data, e.g. a file, across various separate and non-contiguous auxiliary mass storage devices such as magnetic disks. While some systems require a system operator to manage their data distributions, other systems can perform such data distribution automatically. The automatic data distribution and management techniques became well-known through the System/38 and AS/400 mini-computers manufactured by International Business Machine Corp., contributing to their "ease-of-use" reputations. Similar data distribution and management functions are now available on computer systems from a variety of vendors.

There are several different reasons for data distribution within a computer system, including capacity considerations which arise when an entire file cannot fit on a single disk and performance considerations which arise when multiple users require access to different parts of the file simultaneously. Regardless of the reason, however, when logically contiguous data are distributed across multiple auxiliary mass storage devices, the computer system must ensure that all the mass storage devices being used as a set belong to the same set. If they do not, then the logically contiguous data that the mass storage devices are believed to contain will be corrupted. This is true for all types of storage devices, such as magnetic tape, magnetic disk, CD-ROM or a yet to be developed media, that comprise the set.

For a set of mass storage devices to be reliable and fully operational, the computer system must guarantee (1) all the devices within the set are present, and (2) each device can be verified as belonging to the set. Customarily, this is accomplished by maintaining a master configuration record in a stable storage device on the system, which, inter alia, identifies all devices that are configured for the set, and maintaining an identifying token or tokens on each device to identify it as part of a unique configuration set. The token is frequently based on information such as system serial number, device serial number, time-stamps, physical device characteristics (e.g. type, model, features and size), logical device identification number, set number, etc., though the token can be based on anything that will guarantee uniqueness, both on the system to which the devices are attached and among all sets for similar systems. During the booting up of the system, the system reads the master configuration record and utilizes it with the tokens to determine which devices are part of the system configuration.

Over time, the storage capacity of the computer system may need to be changed due to a hardware problem or the addition of new application or data to the system. In addition, the auxiliary storage devices configured as part of storage device sets may also need to be changed for a variety of reasons. When the composition of the storage device sets changes, the master configuration record and the identifying tokens must be updated for all configured members within a set. This is required when devices are added (so that new device is accepted as a valid member of the set), removed (so that old device is no longer accepted as part of the set), or replaced (so that the replaced device can never be mistaken for the replacement device in the future). Typically, in order to make a change in the master configuration records, the system dictates that all mass storage devices that are part of the system configuration must be accessible, i.e. present and operational. System availability needs, however, require that configuration updates and changes be allowed even if not all currently configured devices are available. Otherwise, the system will be unusable until the unavailable devices have been replaced or repaired.

Consequently, it would be desirable to provide a method for making a configuration change when not all members of a configured set are present or operational while guaranteeing the integrity of the set along with the data the set contains.

SUMMARY OF THE INVENTION

In view of the foregoing, it is therefore an object of the present invention to provide an improved method and system for managing mass storage device configuration records.

It is another object of the invention to provide an improved method and system for updating mass storage device configuration records during a configuration change within a computer system.

It is yet another object of the invention to provide an improved method and system for updating mass storage device configuration records during a configuration change within a computer system when not all members of a configured set are present or operational while guaranteeing the integrity of the set along with the data the set contains.

In accordance with the method and system of the present invention, a unit configuration record is stored in a system mass storage device. The unit configuration record is unique to each computer system and includes a configuration identification, a sequence number and an alteration count table. In addition, a logical device identifier is stored in each mass storage device unit within the computer system. The logical device identifier is unique to each mass storage device unit and includes a configuration identification, a unit number and an alteration count. If a configuration update is necessary, the corresponding alteration count of the unit configuration record is first incremented, a new logical device identifier is then built with the new alteration count from the unit configuration record, and the new logical device identifier is written to the mass storage device that requires an update. After the completion of configuration update, the sequence number of the unit configuration record is incremented and the updated information is then merged with the functioning copy of the unit configuration record currently running within the computer system. Finally, the merged copy of the unit configuration record is written onto the system mass storage device. The present invention allows a logical configuration change to be made even when a mass storage device of a configured set is unavailable, and hence it provides more flexibility to the user by eliminating the restriction of all configured mass storage devices must be operational in order to perform a logical configuration change as required by the prior art.

All objects, features and advantages of the present invention will become apparent in the following detailed written description.

BRIEF DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

Various types of mass storage device can be used according to the method and system of the present invention as will be described below. As a preferred embodiment, a direct access storage device (DASD) which allows random data access, will be described as an example of a mass storage device for the purpose of illustrating the present invention.

Figure 1:
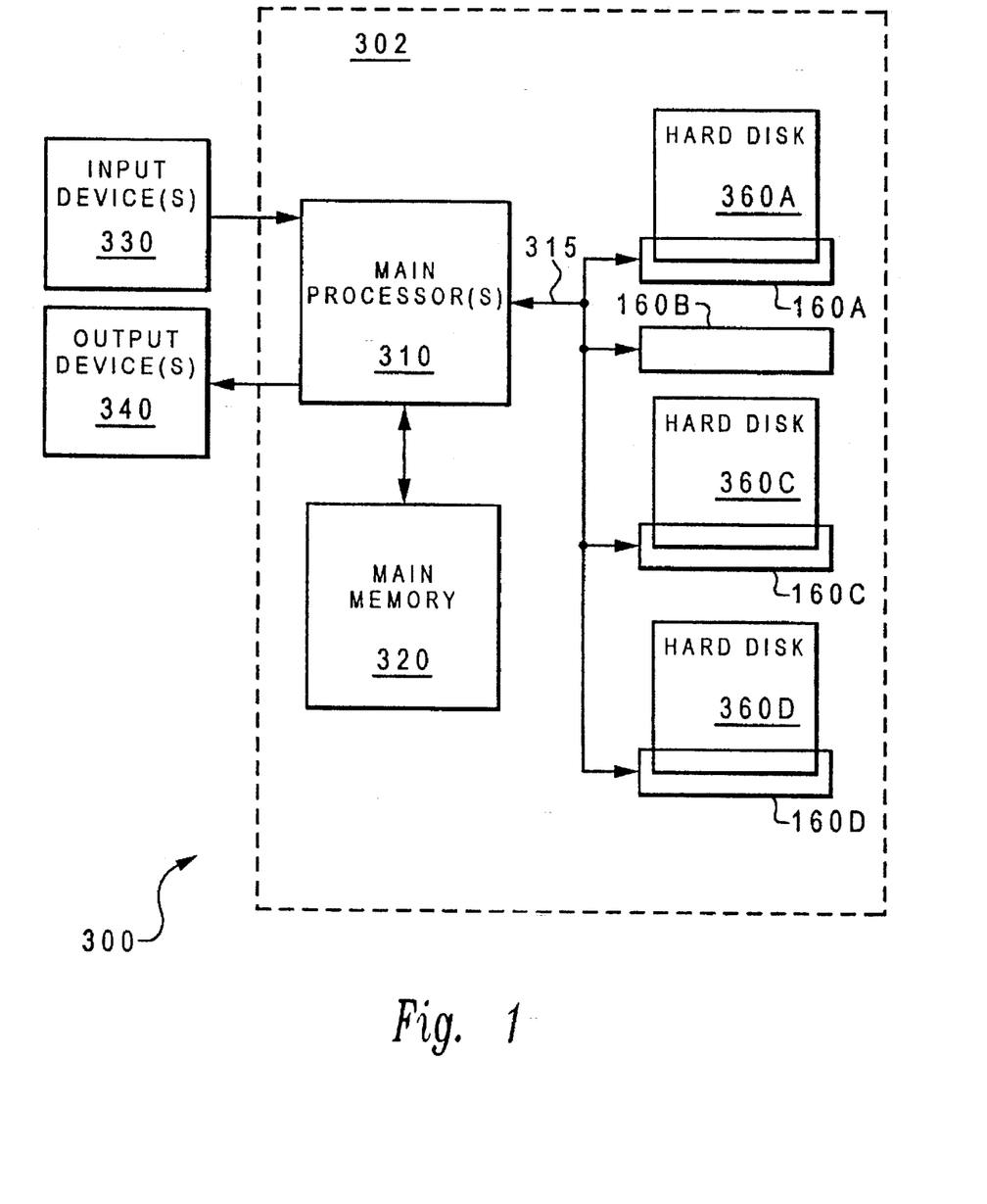
FIG. 1 is a block diagram of a typical computer system utilized by a preferred embodiment of the invention.

FIG. 1 is a block diagram of a typical digital computer system 300 utilized by a preferred embodiment of the invention. The computer includes main processor(s) 310 coupled to a main memory 320 in a computer box 302 with input device(s) 330 and output device(s) 340 attached. Main processor(s) 310 may include a single processor or multiple processors. Input device(s) 330 may include a keyboard, mouse, tablet or other types of input devices. Output device (s) 340 may include a monitor, plotter or other types of output devices. DASDs or hard disks 360A, 360C and 360D are located in adaptor slots 160A, 160C and 160D respectively to provide communications with main processor 310 via bus 315. As indicated in FIG. 1, adaptor slot 160B remains open ready to receive a hard disk.

Figure 2A:
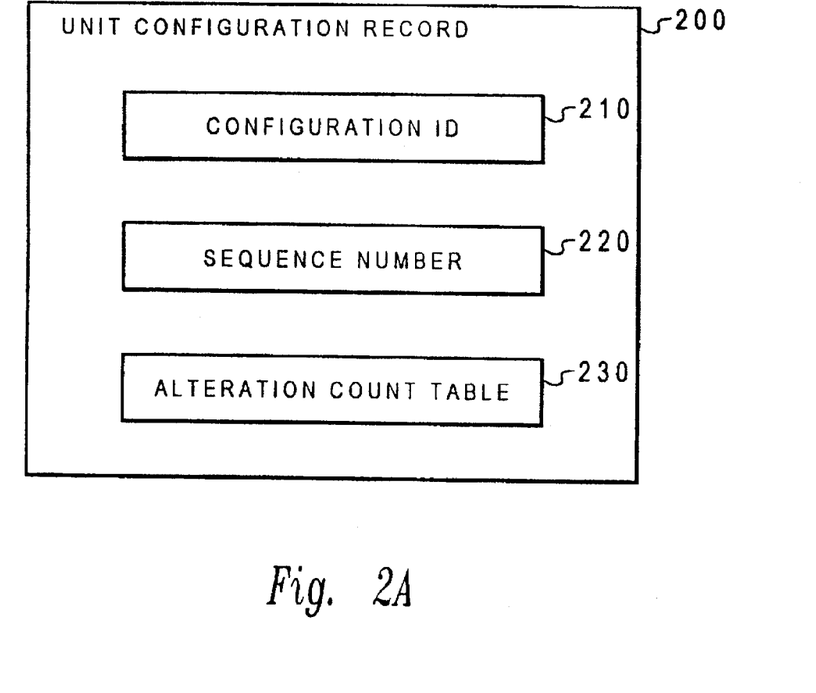
FIGS. 2A and 2B are block diagrams illustrating, respectively, the contents within a unit configuration record and a logical device identifier, according to a preferred embodiment of the invention.

There are two key elements that must be preferably present in the invention, namely, a Unit Configuration Record (UCR) and a Logical Device Identifier (LDI). The UCR is unique to each computer system and it is stored in the system DASD (load source), while duplicate copies of UCR may exist in several DASDs within the same computer system. FIG. 2A is a block diagram illustrating the contents within a UCR according to a preferred embodiment of the invention. In a preferred embodiment of the invention, UCR 200 contains at least (i) configuration identification (configuration ID) 210, (ii) sequence number 220, and (iii) alteration count table 230. The uniqueness of UCR 200 is attributed to the uniqueness of the configuration ID 210 pertaining to a particular computer system. The configuration ID 210 can be in a single level storage configuration such that it will be transparent to a programmer as to whether the data is stored in the computer main memory or in the DASD itself. Sequence number 220 of UCR 200 keeps track of the number of times that UCR 200 has been updated, as sequence number 220 will be incremented each time UCR 200 is updated. Hence, sequence number 220 can be used to identify the most current UCR if multiple UCRs are found in the system, which can then be used to identify the most current system DASD. Alteration count table 230 contains multiple entries, and each entry corresponds to each DASD unit by its unit number within the computer system. The corresponding alteration count entry of alteration count table 230 is incremented whenever a DASD is added, removed or changed for that entry. Hence, the alteration count entry can be used to distinguish an older version of the same DASD unit from the new one.

Figure 2B:
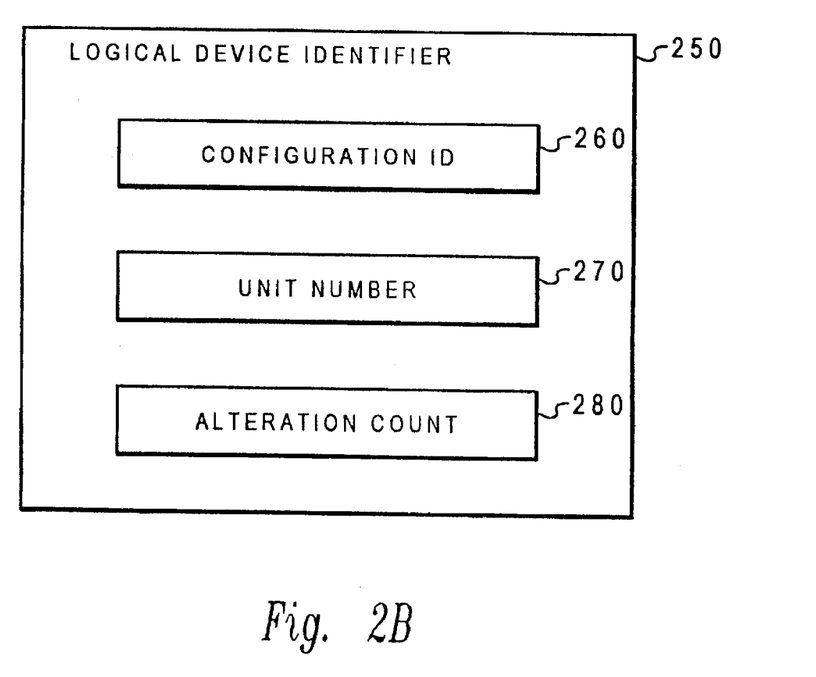

The LDI is an identifier unique to each DASD within the same computer system. FIG. 2B is a block diagram illustrating the contents within a LDI according to a preferred embodiment of the invention. In a preferred embodiment of the invention, LDI 250 contains at least (i) configuration ID 260, (ii) unit number 270, and (iii) alteration count 280. Unit number 270 identifies each DASD within the system while the configuration ID 260 is the same as configuration ID 210 in the UCR. Alternation count 280 is the same as the individual alteration count entry corresponding to each DASD within alternation count table 230 as mentioned above.

In a preferred embodiment of the invention, the LDI and UCR must first be added to a system DASD (load source) during the installation of the computer system. The LDI and UCR are separately added to the system DASD during the scratch install process and initial program load process respectively. Scratch install process is the procedure in which the system DASD is being formatted or reformatted and the operating system code is being installed to the system DASD.

Figure 3:
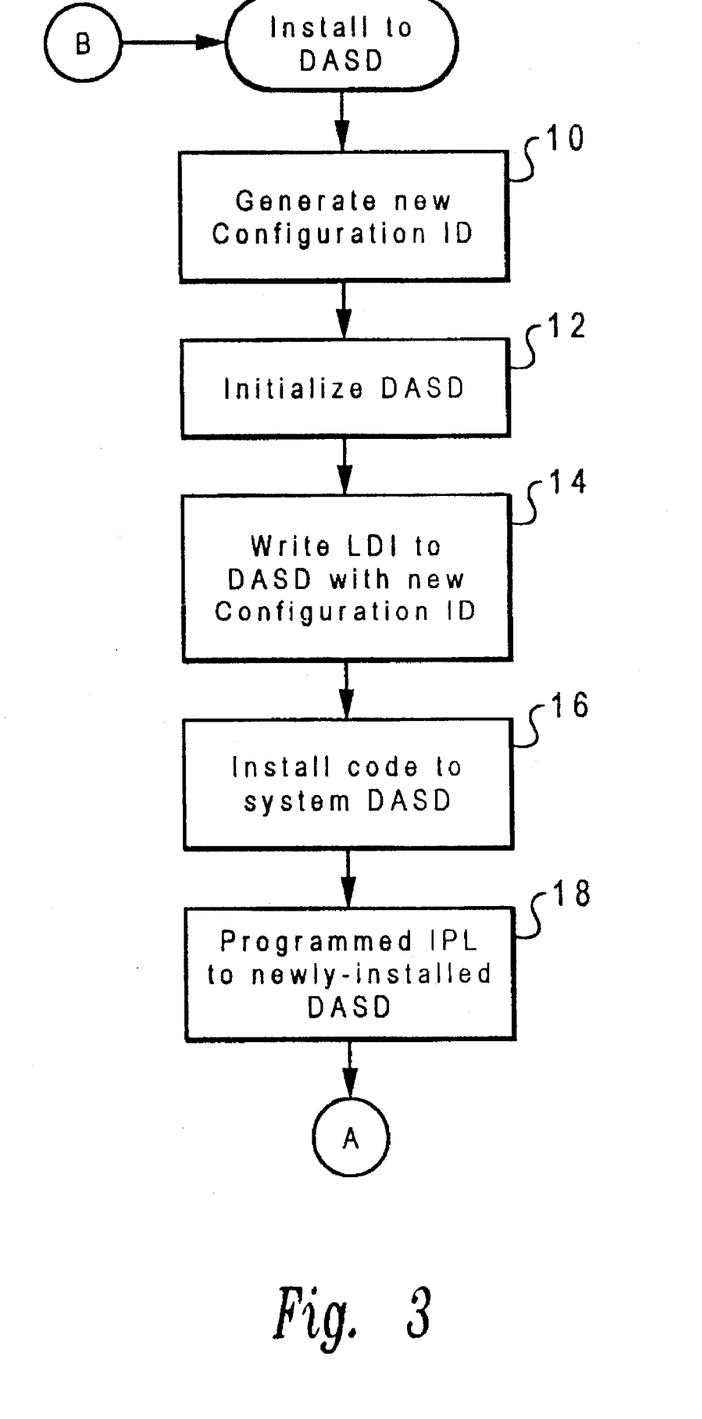
FIG. 3 is a high level logic flow diagram depicting the addition of a logical device identifier to the system mass storage device during its installation.

FIG. 3 is a high level logic flow diagram of the scratch install process. All data in the DASD will be erased during a scratch installation. Starting at block 10, a new configuration ID is first generated by the computer system which can be booted up from a tape or compact disk. At block 12, a DASD is initialized (or formatted) such that all data on the DASD will be erased. A LDI with the new configuration ID is then written on to the DASD at block 14. Next, at block 16, the operating system micro-code is installed to the DASD. Finally, at block 18, the computer system is instructed to boot up from this newly installed system DASD. The scratch install process exits at point A.

Figure 4:
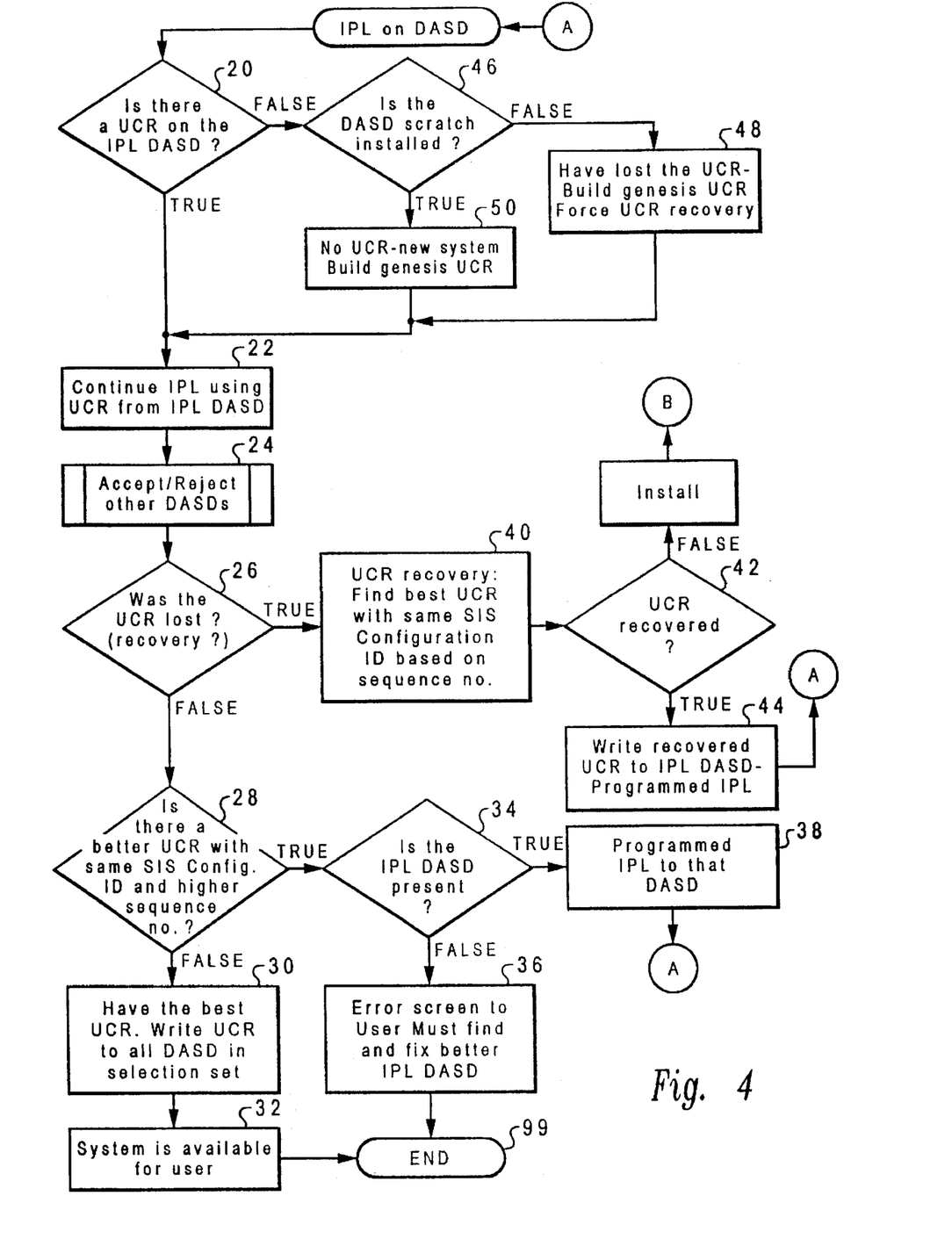
FIG. 4 is a high level logic flow diagram illustrating the addition of a unit configuration record to the system mass storage device during the initial program load.

FIG. 4 is a high level logic flow diagram of the initial program load (IPL) process. IPL process is an initialization procedure that causes the operating system to commence operation and prepares the computer system to run jobs. The UCR is added to the system DASD during this process, if necessary. The process begins at entry point A which is a continuation of exit point A from FIG. 3 or from the beginning of any normal IPL processing. At block 20, a determination is made as to whether or not there is a UCR stored within the DASD. If there is no UCR stored within the DASD, then a determination is made at block 46 as to whether or not the DASD has been scratch installed. If the DASD is newly installed without a UCR, then a brand new UCR called a genesis UCR is built and added to the DASD at block 50. Otherwise, if the DASD is not newly installed, then the existing UCR must be damaged or lost and a temporary genesis UCR is built at block 48 for temporary use until a good UCR can later be recovered from one of the DASDs in the system.

The IPL process continues at block 22 by utilizing the UCR in the system DASD. Then the process interrogates each DASD which is connected to the system and determines whether the DASD should be accepted or rejected at block 24. (The DASD acceptance/rejection process will be further explained in FIG. 5.) At block 26, a determination is made as to whether or not a UCR recovery procedure is necessary. A UCR recovery procedure is necessary if a temporary genesis UCR was built at block 48 because the original UCR was either damaged or lost. At this point, in block 40, an attempt is made to find the best UCR copy that was used as a duplicate for the original UCR and is stored in one of the DASDs within the system. If the original UCR cannot be recovered after the determination at block 42, the process exits at point B which points to an entry point B of FIG. 3. This means if the original UCR cannot be recovered, the DASD will have to be scratch installed and all the data on the DASD will be permanently erased. On the contrary, if the original UCR can be recovered from a duplicate UCR stored in one of the DASDs, then the duplicate UCR is written over the temporary genesis UCR in the system DASD at block 44. The process then exits at point A which points back to the entry point A of this flow diagram, and the IPL process will start from the beginning, this time, with a valid UCR.

Even if no UCR recovery procedure is necessary, a determination is still required at block 28 as to whether or not there is a "better" UCR with the same configuration ID but a higher sequence number. A situation of two UCRs with the same configuration ID but different sequence numbers may arise when a mirror system DASD is used. For example, if the system DASD that was utilized to boot up the system is non-operational due to some unforeseeable reason, the mirror system DASD will automatically be utilized to maintain the operation of the system. Thus, later when the system is required to re-boot, the mirror system DASD will contain a "better" UCR or rather, a more current version of the UCR. At block 34, a determination is made as to whether or not the bootable disk is also present at the time. If the bootable disk is present, then the IPL is programmed to the DASD with a better UCR such that the system can boot up from that DASD; then the process exits at point A. Otherwise, an error will be displayed on the screen to the user at block 36 and the process terminates at block 99. If the system DASD has the best UCR, then duplicates of the UCR are made to different DASDs within the system, at block 30, for recovery purposes. The system will then be available for use at block 32 and the IPL process terminates at block 99.

Figure 5:
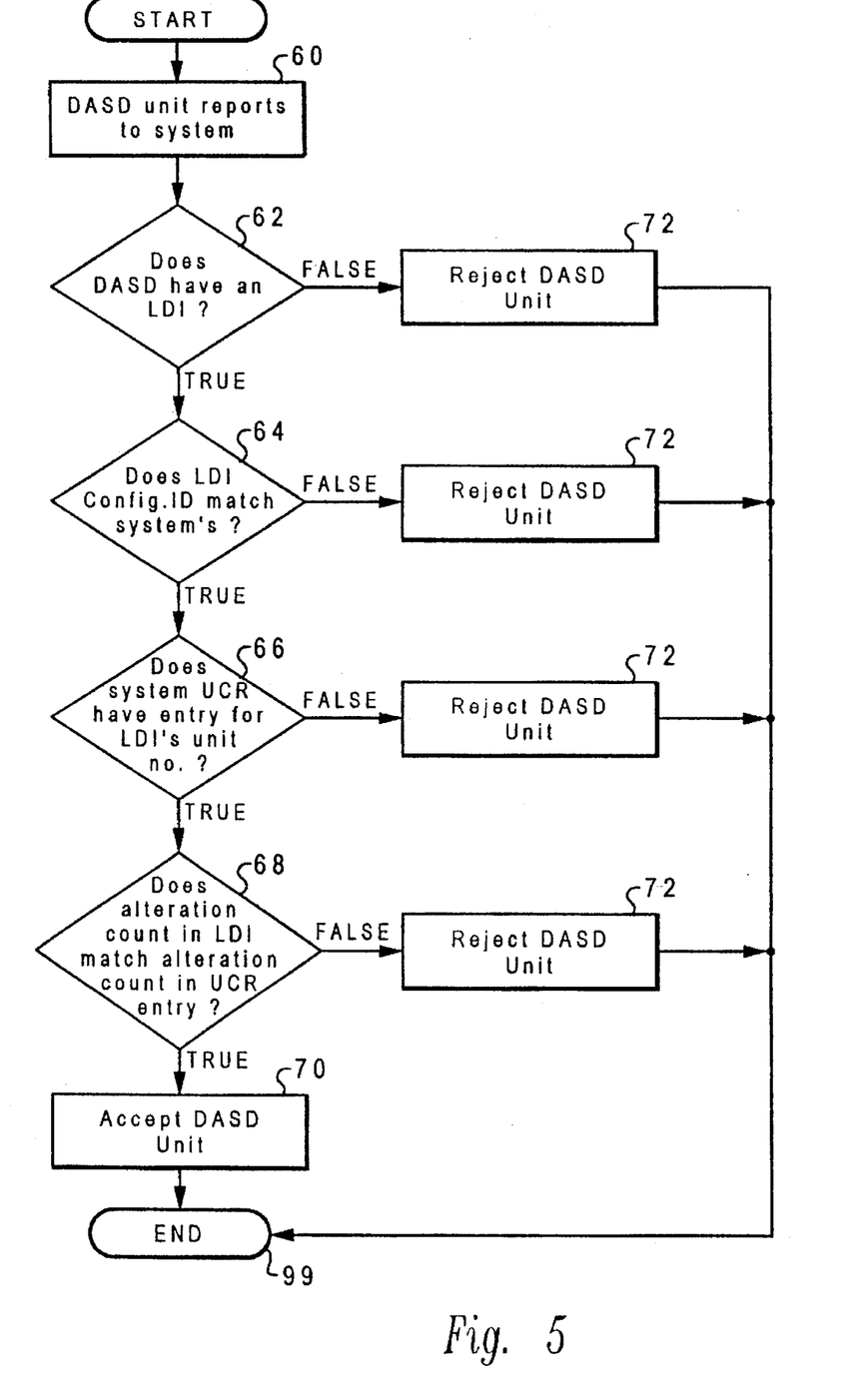
FIG. 5 is a high level logic flow diagram depicting the mass storage device acceptance/rejection process within FIG. 4 in detail.

FIG. 5 is a high level logic flow diagram illustrating the DASD Acceptance/Rejection process performed at block 24 of FIG. 4. Starting at block 60, each DASD unit reports its presence to the computer system. Then a determination is made at block 62 as to whether or not the DASD has a LDI. If the determination is positive, then a determination is made at block 64 as to whether or not the configuration ID within the LDI in the DASD matches with the functioning copy currently running in the computer system. If the determination is positive, then a determination is made at block 66 as to whether or not the system UCR has an entry for the unit number of the LDI. If the determination is positive, then a determination is made at block 68 as to whether or not the alteration count in the LDI matches the alteration count in the UCR for that unit entry. If the determination is positive, the reporting DASD unit will be accepted at block 70. Otherwise, if the answer is negative to any of the determination made at blocks 62, 64, 66 or 68, then the DASD unit will be rejected as shown in block 72. Finally, the DASD Acceptance/Rejection process terminates at block 99.

Figure 6:
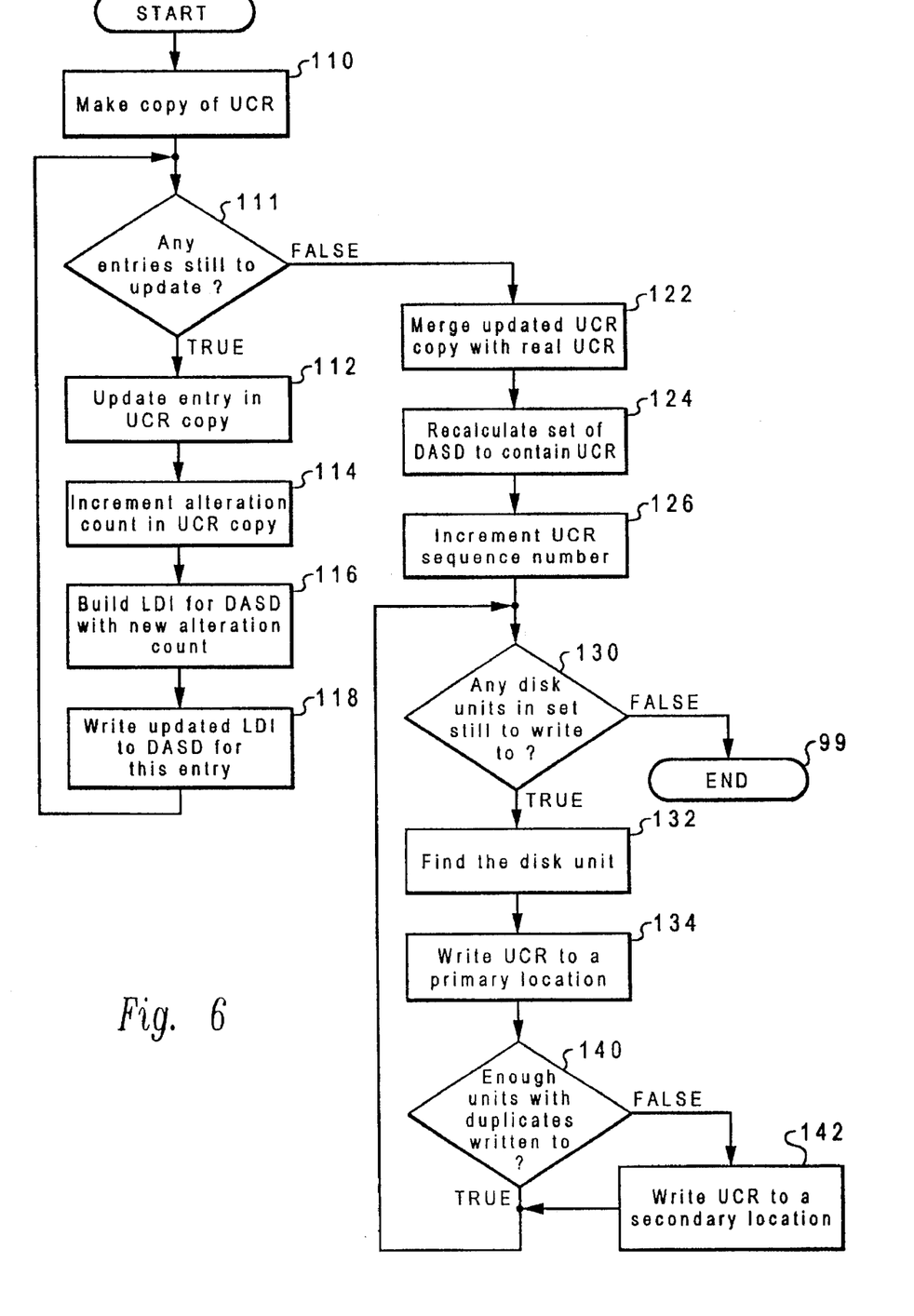
FIG. 6 is a high level logic flow diagram illustrating the method of updating mass storage device configuration records during a configuration change according to a preferred embodiment of the invention.

FIG. 6 is a high level logic flow diagram depicting the process of updating a UCR during a configuration change within the computer system according to a preferred embodiment of the invention. Starting at block 110, a temporary working copy of the UCR is made from either the functional copy in the main memory of the computer system or the master copy stored in the system load source DASD. A determination is made, at block 111, as to whether or not an update to the entries needs to be made. Such information can be from, for example, a file which tracks all update entries or a prompt to the user requesting the user's input. If an update is required, the temporary copy of the UCR is first updated at block 112. Then, the alteration count of the temporary copy of the UCR is incremented at block 114. A new LDI is built utilizing the new alteration count at block 116. Finally, at block 118, the new LDI is written to the DASD if no LDI presently exists on the DASD or the new LDI is written over the old LDI. The entry updating process illustrated at blocks 111–118 continues until all the updates are completed.

If all the configuration updates have been completed, then the updated temporary copy of UCR is merged with the functioning copy of UCR at block 122. The techniques for merging these two files is well known to those who are skilled in the art of computer engineering. Essentially, the updated temporary copy of the UCR can be merged into the functioning copy of the UCR or vice versa. At block 124, the set of DASDs intended for storing a duplicate copy of UCR is recalculated. Then, at block 126, the sequence number of the UCR is incremented. Finally, the process enters a loop to find the set of DASDs calculated in block 124. If a determination is made at block 130 that a DASD within the set requires a duplicate UCR, then that particular DASD is located at block 132, and the duplicate UCR is written to the primary location of that DASD at block 134. Certain DASDs within the set may contain more than one duplicate UCR. If it is determined to be such at block 140, a second duplicate UCR will be written to a secondary location of the same DASD at block 142. Finally, if there is no more DASD within the set that need to be written to at block 130, the process will then terminate at block 99.

While the invention has been particularly shown and described with reference to a preferred embodiment, it will be understood by those skilled in the art that various changes in form and detail may be made therein without departing from the spirit and scope of the invention.

What is claimed is:

1. A data processing system which allows mass storage device configuration records to be updated during a configuration change when not all members of a configured set are operational, comprises:

a unit configuration record stored in a system mass storage device, wherein said unit configuration record is unique to said data processing system, said unit configuration record including a configuration identification, a sequence number and an alteration count corresponding to each mass storage device unit within said data processing system;

a logical device identifier stored in each mass storage unit for said data processing system, wherein said logical device identifier is unique to each mass storage device unit, said logical device identifier including said configuration identification, a unit number and said alteration count;

means for creating a temporary copy of said unit configuration record;

means for determining whether or not an update of said unit configuration record is necessary;

means for updating an entry of said temporary copy of said unit configuration record, incrementing said alteration count in said temporary copy of said unit configuration record, building a new logical device identifier with said alteration count, writing said new logical device identifier to a mass storage device that requires update and returning to said determining step, in response to a determination that an update of said unit configuration record is necessary; and means for incrementing said sequence number in said temporary copy of said unit configuration record, merging said temporary copy of said unit configuration record with a functioning copy of said unit configuration record to form a merged copy of said unit configuration record and writing said merged copy of said unit configuration record to said system mass storage device, in response to a determination that an update of said unit configuration record is not necessary.

2. The data processing system which allows mass storage device configuration records to be updated during a configuration change in claim 1, wherein said merged copy of said unit configuration record is formed by merging said temporary copy of said unit configuration record into said functioning copy of said unit configuration record within said data processing system.

3. The data processing system which allows mass storage device configuration records to be updated during a configuration change in claim 1, wherein said merged copy of said unit configuration record is formed by merging said functioning copy of said unit configuration record within said data processing system into said temporary copy of said unit configuration record.

4. The data processing system which allows mass storage device configuration records to be updated during a configuration change in claim 1, wherein said unit configuration record has duplicate copies distributed throughout at least one mass storage device unit within said data processing system.

5. The data processing system which allows mass storage device configuration records to be updated during a configuration change in claim 1, wherein said unit configuration record has a unit identification entry for each mass storage device.

6. The data processing system which allows mass storage device configuration records to be updated during a configuration change in claim 1, wherein said mass storage device unit is a direct access storage device.

7. A method for updating mass storage device configuration records during a configuration change within a computer system when not all members of a configured set are operational, wherein said computer system includes a unit configuration record stored in a system mass storage device, wherein said unit configuration record is unique to said computer system, said unit configuration record including a configuration identification, a sequence number and an alteration count corresponding to each mass storage device unit within said computer system;

a logical device identifier stored in each mass storage unit for said computer system, wherein said logical device identifier is unique to each mass storage device unit, said logical device identifier including said configuration identification, a unit number and said alteration count;

said method comprising the steps of:

creating a temporary copy of said unit configuration record in said computer system;

determining whether or not an update of said unit configuration record is necessary;

in response to a determination that an update of said unit configuration record is necessary, updating an entry of said temporary copy of said unit configuration record, incrementing said alteration count in said temporary copy of said unit configuration record, building a new logical device identifier with said alteration count, writing said new logical device identifier to a mass storage device that requires update and returning to said determining step;

in response to a determination that an update of said unit configuration record is not necessary, incrementing said sequence number in said temporary copy of said unit configuration record, merging said temporary copy of said unit configuration record with a functioning copy of said unit configuration record to form a merged copy of said unit configuration record and writing said merged copy of said unit configuration record to said system mass storage device.

8. The method for updating mass storage device configuration records during a configuration change within a computer system in claim 7, wherein said merged copy of said unit configuration record is formed by merging said temporary copy of said unit configuration record into said functioning copy of said unit configuration record within said computer system.

9. The method for updating mass storage device configuration records during a configuration change within a computer system in claim 7, wherein said merged copy of said unit configuration record is formed by merging said functioning copy of said unit configuration record within said computer system into said temporary copy of said unit configuration record.

10. The method for updating mass storage device configuration records during a configuration change within a computer system in claim 7, wherein said unit configuration record has duplicate copies distributed throughout at least one mass storage device unit within said computer system.

11. The method for updating mass storage device configuration records during a configuration change within a computer system in claim 7, wherein said unit configuration record has a unit identification entry for each mass storage device.

12. The method for updating mass storage device configuration records during a configuration change within a computer system in claim 7, wherein said mass storage device unit is a direct access storage device.

* * * * *